(12) United States Patent
Chen et al.

(10) Patent No.: US 11,108,109 B2
(45) Date of Patent: Aug. 31, 2021

(54) DEVICE AND METHOD FOR PRESS-FITTING BATTERY TOP COVER

(71) Applicant: CONTEMPORARY AMPEREX TECHNOLOGY CO., LIMITED, Ningde (CN)

(72) Inventors: Shaoyu Chen, Ningde (CN); Jiang Lin, Ningde (CN); Xiang Fan, Ningde (CN); Chao Yang, Ningde (CN); Hongxin Fang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/139,801

(22) Filed: Dec. 31, 2020

(65) Prior Publication Data

US 2021/0126309 A1     Apr. 29, 2021

Related U.S. Application Data

(63) Continuation of application No. PCT/CN2019/108132, filed on Sep. 26, 2019.

(30) Foreign Application Priority Data

Sep. 26, 2018 (CN) .......................... 201821572140.6

(51) Int. Cl.
*H01M 50/166* (2021.01)
*H01M 50/15* (2021.01)

(52) U.S. Cl.
CPC ......... *H01M 50/166* (2021.01); *H01M 50/15* (2021.01)

(58) Field of Classification Search
CPC ............................ H01M 50/166; H01M 50/15
See application file for complete search history.

(56) References Cited

U.S. PATENT DOCUMENTS 5,540,127 A * 7/1996 Binder .................... H01M 4/82
83/100

FOREIGN PATENT DOCUMENTS

CN         106180075 A     12/2016
CN         107309215 A     11/2017
(Continued)

OTHER PUBLICATIONS

Machine translation of CN-108288726-A (Year: 2018).*
(Continued)

*Primary Examiner* — Brian R Ohara
*Assistant Examiner* — Brent C Thomas
(74) *Attorney, Agent, or Firm* — Morgan, Lewis & Bockius LLP

(57) ABSTRACT

The present application relates to the technical field of battery and provides a device for press-fitting a battery top cover. The device for press-fitting a battery top cover comprises a press-fitting body. The press-fitting body 1 is arranged on one side of the battery top cover facing away from a battery housing. A pneumatic cleaning assembly is arranged on one side of the press-fitting body facing the battery top cover. The pneumatic cleaning assembly is arranged to allow the chips to move out of the battery housing together with gas along a gap between the battery housing and the battery top cover. In the present application, the pneumatic cleaning assembly is arranged to allow the chips to move out of the battery housing together with gas along the gap between the battery housing and the battery top cover under the action of the gas flow so that to keep the inside of the battery housing clean, avoid short circuit in the battery caused by the chips, and improve the safety performance of the battery.

12 Claims, 3 Drawing Sheets

(56) References Cited

FOREIGN PATENT DOCUMENTS

| CN | 108075146 A | | 5/2018 |
|----|----|----|----|
| CN | 207479054 U | | 6/2018 |
| CN | 108288726 A | * | 7/2018 |
| CN | 108288726 A | | 7/2018 |
| CN | 208674277 U | | 3/2019 |
| JP | 2017134909 A | | 8/2017 |

OTHER PUBLICATIONS

International Search Report and Written Opinion, PCT/CN2019/108132, dated Jan. 2, 2020, 12 pgs.
Contemporary Amperex Technology Co., Limited, Written Opinion of the International Searching Authority, PCT/CN2019/108132, dated Jan. 2, 2020, 5 pgs.

* cited by examiner

DEVICE AND METHOD FOR PRESS-FITTING BATTERY TOP COVER

CROSS REFERENCE TO RELATED APPLICATIONS

This application is a continuation application of PCT Patent Application No. PCT/CN2019/108132, entitled "BATTERY TOP COVER PRESS-FIT DEVICE AND METHOD" filed on Sep. 26, 2019, which claims priority to Chinese Patent Application No. 201821572140.6, filed with the State Intellectual Property Office of the People's Republic of China on Sep. 26, 2018, and entitled "DEVICE AND METHOD FOR PRESS-FITTING BATTERY TOP COVER", all of which are incorporated herein by reference in their entirety.

TECHNICAL FIELD

The present application relates to the technical field of battery and in particular, to a device and method for press-fitting a battery top cover.

BACKGROUND

With the development of society, automobiles are increasingly popular. In order to alleviate the resulting environmental problems, new energy vehicles have developed rapidly, which at the same time promoted the rapid development of the power battery industry. A power battery comprises a jelly roll, a battery housing and a battery top cover. The battery top cover needs to be installed into the battery housing through a press-fitting process.

Currently, the battery top cover and the battery housing are mainly made of aluminum. During the press-fitting process, aluminum chips may be produced from frictions between the battery housing and the battery top cover. Such aluminum chips may fall into the battery housing, which may damage the jelly roll. For example, the separator or electrode may be punctured, leading to micro short circuit or direct short circuit during the charging process of the battery, which further leads to unsuccessful charging of the battery, or even causes fire to the battery. This seriously affects the safety performance of the battery.

SUMMARY

An objective of the present application is to provide a press-fitting device and method for press-fitting a battery having a battery top cover and a battery housing, so as to keep the interior of the battery housing clean and improve the safety performance of a battery.

A first aspect of the present application provides a press-fitting device associated with a battery having a battery top cover and a battery housing, the press-fitting device comprising:
 a press-fitting body, wherein the press-fitting body is arranged on one side of the battery top cover; one side of the press-fitting body facing the battery top cover is provided with a pneumatic cleaning assembly; the pneumatic cleaning assembly is arranged to allow chips to move out of the battery housing together with gas along a gap between the battery housing and the battery top cover.

In some embodiments, the pneumatic cleaning assembly comprises a positive pressure assembly. The positive pressure assembly is arranged to introduce positive pressure gas into the battery housing.

In some embodiments, the positive pressure assembly comprises a positive pressure gas passage. A gas outlet end of the positive pressure gas passage is a positive pressure opening. The positive pressure opening is arranged at or near the middle of the press-fitting body facing the battery top cover.

In some embodiments, the positive pressure opening is provided with a nozzle.

In some embodiments, the pneumatic cleaning assembly comprises a negative pressure assembly. The negative pressure assembly is arranged to introduce a negative pressure gas into the gap between the battery top cover and the battery housing.

In some embodiments, the negative pressure assembly comprises a negative pressure gas passage. A gas inlet end of the negative pressure gas passage is a negative pressure opening. The negative pressure opening is arranged on an edge of the press-fitting body facing the battery top cover.

In some embodiments, the negative pressure opening is an annular hole shaped structure.

In some embodiments, the negative pressure opening is provided therein with a reinforcing rib. The reinforcing rib connects an inner ring and an outer ring of the annular hole shaped structure.

In some embodiments, the negative pressure assembly further comprises a chips storage tank. The chips storage tank is arranged on the side of the press-fitting body facing away from the battery top cover and is communicated with the negative pressure gas passage.

In some embodiments, the device for press-fitting a battery top cover provided in the present application further comprises a press-fitting cap. The press-fitting cap is arranged on the side of the press-fitting body facing away from the battery top cover and the press-fitting cap is provided with a gas source interface communicated with the pneumatic cleaning assembly.

A second aspect of the present application provides a method for press-fitting a battery having a battery top cover and a battery housing, the method comprising:
 applying, by a press-fitting body, a force onto the battery top cover to press-fit the battery top cover to the battery housing; and
 introducing, by a positive pressure assembly of a pneumatic cleaning assembly, a positive pressure gas into the battery housing.

In some embodiments, the method for press-fitting a battery top cover further comprises:
 introducing, by a negative pressure assembly of the pneumatic cleaning assembly, negative pressure gas into a gap between the battery top cover and the battery housing.

The technical solutions provided by the present application have the following beneficial effects:
 the present application, by providing the pneumatic cleaning assembly, allows chips to move out of the battery housing together with gas along the gap between the battery housing and the battery top cover under the action of the gas flow, thereby keeping the inside of the battery housing clean, avoiding short circuit in the battery caused by the chips, and improving the safety performance of the battery.

It may be understood that the above general description and the following detailed description are exemplary and are not intended to limit the present application.

Figure 1:
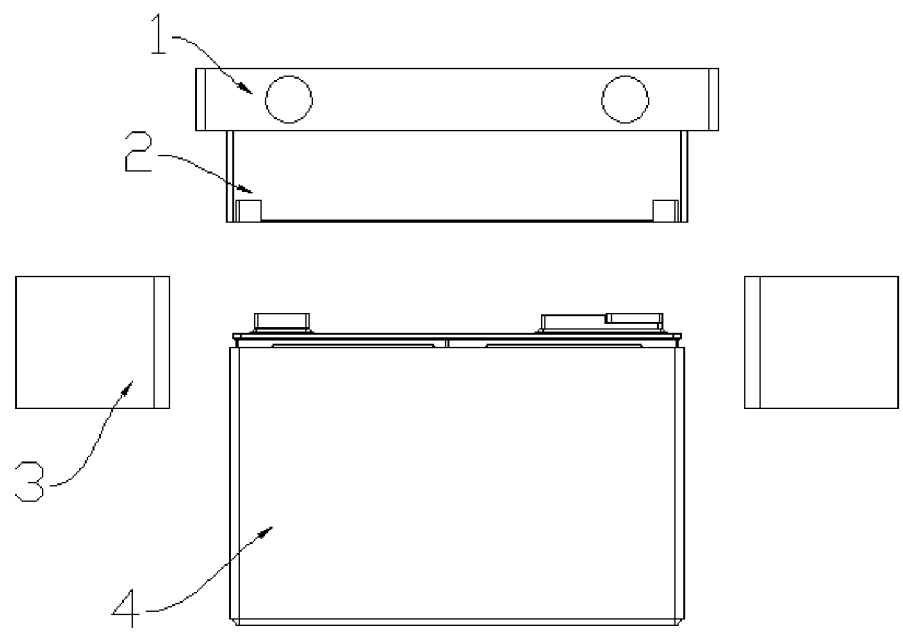
FIG. 1 is a structural schematic diagram of a device for press-fitting a battery top cover provided by an embodiment of the present application.

Description of reference signs in the accompanying drawings:
1. press-fitting body;
    10. pneumatic cleaning assembly;
        100. positive pressure assembly;
            1000. positive pressure gas passage;
            1002. positive pressure opening;
            1004. nozzle;
        102. negative pressure assembly;
            1020. negative pressure gas passage;
            1022. negative pressure opening;
            1024. reinforcing rib;
            1026. chips storage tank;
        12. positioning avoidance opening;
2. press-fitting cap;
    20. gas source interface;
3. positioning block;
    30. top cover positioning portion;
    32. housing positioning portion;
    34. guide bevel;
    36. press-fitting groove;
4. battery;
    40. battery top cover;
    42. battery housing.

The accompanying drawings herein, which are incorporated into the specification and constitute a part of the specification, illustrate embodiments of the present application and are used to explain the principles of the present application together with the specification.

DETAILED DESCRIPTION

The technical contents, structural features, objectives and effects of the present application are described in detail below with reference to specific embodiments and accompanying drawings.

As shown in FIGS. 1 to 5, an embodiment of the present application provides a device for press-fitting a battery top cover, comprising a press-fitting body 1. The press-fitting body 1 is arranged on a side of a battery top cover 40 facing away from a battery housing 42, and is used to apply a force onto the battery top cover 40 to press-fit the battery top cover 40 into the battery housing 42 to be assembled into a battery 4. A pneumatic cleaning assembly 10 is arranged on one side of the press-fitting body 1 facing the battery top cover 40. The pneumatic cleaning assembly is arranged to allow chips (such as aluminum chips generated by frictions between the battery top cover 50 and the battery housing 52) to move out of the battery housing 42 together with gas along a gap between the battery housing 42 and the battery top cover 40. Thus, it keeps the inside of the battery housing 42 clean, and avoids short circuit in the battery 4 caused by the chips.

Figure 3:
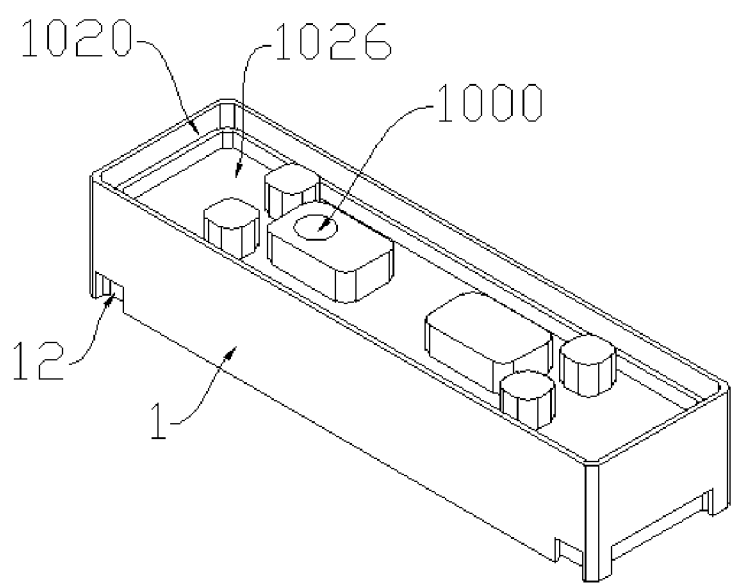
FIG. 3 is a structural schematic diagram of a press-fitting body provided by an embodiment of the present application.
Figure 4:
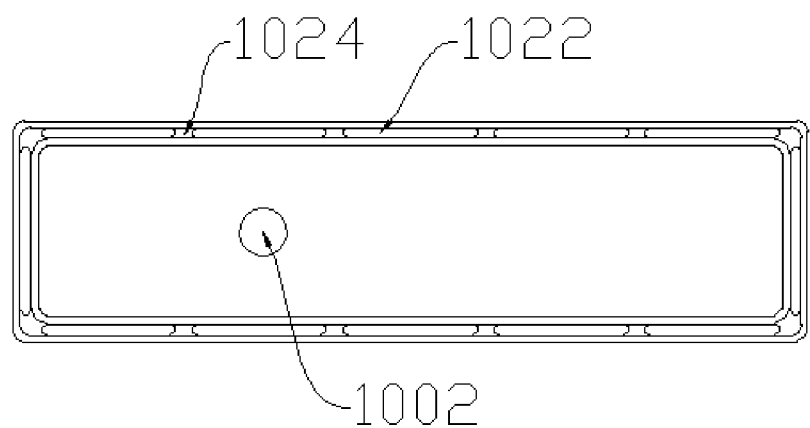
FIG. 4 is a bottom view of the press-fitting body shown in FIG. 3.

Specifically, a surface of the side of the press-fitting body 1 facing the battery top cover 40 may be larger than a surface of the battery top cover 40, thus the pneumatic cleaning assembly 10 can cover the annular gap formed between the battery top cover 40 and the battery housing 42. As shown in FIGS. 3 and 4, in an aspect, the pneumatic cleaning assembly 10 may comprise a positive pressure assembly 100. The positive pressure assembly 100 is arranged to introduce positive pressure gas into the battery housing 42, thereby driving the chips in the battery housing 42 to flow out along the gap between the battery top cover 40 and the battery housing 42 together with the gas.

Further, the positive pressure assembly 100 comprises a positive pressure gas passage 1000. The positive pressure gas passage 1000 is arranged inside the press-fitting body 1. A gas outlet end of the positive pressure gas passage 1000 is a positive pressure opening 1002. The positive pressure opening 1002 is arranged at the middle of the press-fitting body 1 facing the battery top cover 40 to introduce the positive pressure gas into a middle region of the battery housing 42 to form a gas flow that drives the chips to flow towards an inner side wall of the battery housing 42 and divert at a side wall of the battery housing 42 to flow towards the battery top cover 40 and out of the battery housing 42. The direction of the gas flow is stable and controllable, which provides good cleaning effect. In some embodiments, the positive pressure opening 1002 is directly opposite to a liquid injection opening of the battery top cover 40, so as to avoid damaging the structure of the battery top cover 40. It may be understood that the positive pressure opening 1002 may also be directly opposite to other through holes arranged on the battery top cover 40, as long as it is possible to run through the battery top cover 40 along a thickness direction of the battery top cover 40, and to introduce the positive pressure gas into the battery housing 42.

In some embodiments, the positive pressure gas passage 1000 is arranged inside the press-fitting body 1 and extends in the thickness direction of the battery top cover 40. It is structurally simple and easy to process.

Further, the positive pressure opening 1002 is provided with a nozzle 1004 to form a stronger gas flow to provide better cleaning effect. In addition, a reliable sealing fit is formed between the nozzle 1004 and the battery top cover 40 (the liquid injection opening of the battery top cover 40) by extending the nozzle 1004 towards the side facing away from the press-fitting body 1 and protruding the nozzle from a surface of the press-fitting body 1. It avoids the uncontrollable movement of the chips caused by the leakage of the positive pressure gas. The nozzle 1004 may be made of a soft material to ensure the sealing effect.

In another aspect, the pneumatic cleaning assembly 10 may comprise a negative pressure assembly 102. The negative pressure assembly 102 is arranged around the gap between the battery top cover 40 and the battery housing 42 to form negative pressure gas to suck the gas in the battery housing 42, thereby driving the chips to move out of the battery housing 42 together with the gas.

Further, the negative pressure assembly 102 comprises a negative pressure gas passage 1020. The negative pressure gas passage 1020 is arranged inside the press-fitting body 1. A gas inlet end of the negative pressure gas passage 1020 is a negative pressure opening 1022. The negative pressure opening 1022 is arranged on an edge of the press-fitting body 1 facing the battery top cover 40 to form negative pressure suction at the inner side wall of the battery housing 42 to suck the chips out of the battery housing 42.

In some embodiments, the negative pressure gas passage 1020 is arranged inside the press-fitting body 1 and extends in the thickness direction of the battery top cover 40. It is structurally simple and easy to process.

Further, the negative pressure opening 1022 may be arranged as an annular hole shaped structure to form suction around the inner side wall of the battery housing 42 inside the battery housing 42, thereby avoiding any dead corner difficult to clean. It may be understood that the negative pressure opening 1022 may also be arranged as a hole strip shaped structure distributed at intervals. The hole stripe shaped structure is arranged around the gap between the battery top cover 40 and the battery housing 42.

Further, when the negative pressure opening 1022 is an annular hole shaped structure, a reinforcing rib 1024 may be arranged in the negative pressure opening 1022, and an inner ring and an outer ring of the annular hole shaped structure are connected by the reinforcing rib 1024 to enhance the stability of the structure.

Further, the negative pressure assembly 102 may also comprise a chips storage tank 1026. The chips storage tank 1026 is arranged on the side of the press-fitting body 1 facing away from the battery top cover 40 and is communicated with the negative pressure gas passage 1020 to store the chips sucked from the battery housing 42 within the chips storage tank 1026, and perform cleaning regularly to avoid clogging in the pneumatic cleaning assembly 10. It may be understood that the chips storage tank 1026 is not communicated with the positive pressure gas passage 1000.

It may be understood that the pneumatic cleaning assembly 10 may comprise only the positive pressure assembly 100 or only the negative pressure assembly 102. In some embodiments, the pneumatic cleaning assembly 10 comprises both the positive pressure assembly 100 and the negative pressure assembly 102 to form a stable and controllable gas flow to ensure the cleaning effect.

Figure 2:
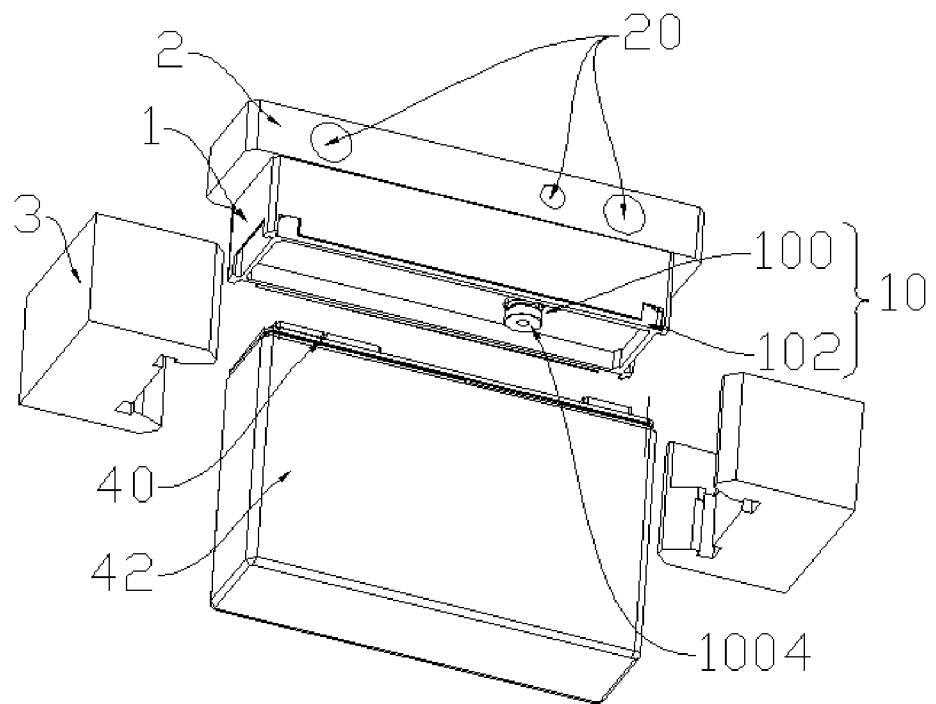
FIG. 2 is a three-dimensional structural schematic diagram of the device for press-fitting a battery top cover shown in FIG. 1.

Further, as shown in FIGS. 1 and 2, the device for press-fitting a battery top cover provided by the present application further comprises a press-fitting cap 2. The press-fitting cap 2 is arranged on the side of the press-fitting body 1 facing away from the battery top cover 40, and the press-fitting cap 2 is provided with a gas source interface 20. The gas source interface 20 is communicated with the pneumatic cleaning assembly 10. Communicating with an external gas source through the gas source interface 20 facilitates the connection. Specifically, the gas source interface 20 may comprise a positive pressure gas source interface and a negative pressure gas source interface. The positive pressure gas source interface is communicated with the positive pressure gas passage 1000, and the negative pressure gas source interface is communicated with the negative pressure gas passage 1020.

In some embodiments, the press-fitting body 1 and the press-fitting cap 2 are arranged as two separate components and are connected to each other by a detachable connecting member (such as a threaded fastener). The pneumatic cleaning assembly 10 and the gas source interface 20 are separately arranged at two components, so as to avoid forming a complicated gas flow path in the press-fitting body 1 and make the press-fitting body 1 easier to manufacture. It may be understood that the press-fitting body 1 and the press-fitting cap 2 may also be arranged as an integral structure. Referring to also FIGS. 1 and 2, in order to prevent deviation in position or direction of the force applied by the press-fitting body 1, the device for press-fitting a battery top cover provided in the present application may further comprise a battery positioning mechanism. The battery positioning mechanism is used to fix the battery 4 and align the battery top cover 40 with the battery housing 42. It ensures that the press-fitting body 1 applies the force exactly on the side of the battery top cover 40 facing away from the battery housing 42 and the battery top cover 40 moves linearly in the direction towards the battery housing 42.

When the battery positioning mechanism is arranged, the side of the press-fitting body 1 facing the battery top cover 40 should be provided with a positioning avoidance opening 12 to avoid interference with the battery positioning mechanism 1 during the pressing down of the press-fitting body 1, so that the press-fitting body 1 can press-fit the battery top cover 40 in place.

Figure 5:
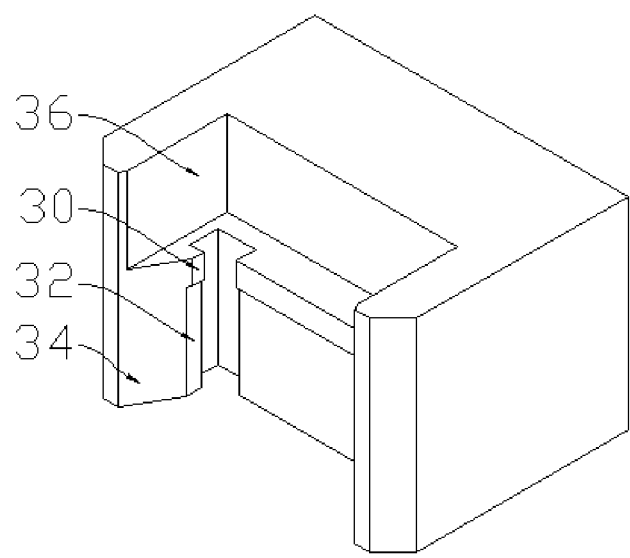
FIG. 5 is a structural schematic diagram of a battery positioning block provided by an embodiment of the present application.

Further, as shown in FIG. 5, the battery positioning mechanism may comprise two positioning blocks 3. The two positioning blocks 3 are respectively arranged at both ends of the battery 4 in its length direction, and may relatively move in the length direction of the battery 4 to clamp or release the battery 4. The positioning block 3 comprises a housing positioning portion 32 and a top cover positioning portion 30 distributed along the thickness direction of the battery top cover 40. The top cover positioning portion 30 is arranged on one side of the housing positioning portion 32 facing the press-fitting body 1. This means the press-fitting body 1 is in contact with the battery top cover 40 during the press-fitting, so that the gap between the battery top cover 40 and the battery housing 42 is directly opposite to the pneumatic cleaning assembly 10.

Specifically, since the size of a cross section of the battery top cover 40 is smaller than the size of the battery housing 42 (the battery top cover 40 can be embedded in the battery housing 42), the size of a cross section of the top cover positioning portion 30 is smaller than the size of the housing positioning portion 32 so that both the battery top cover 40 and the battery housing 4 may be well positioned.

Further, a guide bevel 34 may be arranged on one side of the positioning block 3 facing the battery 4. The guide bevel 34 is flared, so that the battery top cover 40 and the battery housing 42 may be smoothly clamped between the two positioning blocks 3 without positioning deviation.

Further, one end of the battery positioning mechanism facing the press-fitting body 1 may also be provided with a press-fitting groove 36 so that the pneumatic cleaning assembly 10 is aligned with the battery top cover 40 to provide better cleaning effect.

An embodiment of the present application further provides a method for press-fitting a battery top cover, comprising:

applying, by a press-fitting body 1, a force onto a battery top cover 40 to press-fit the battery top cover 40 to a battery housing 42; and introducing, by the positive pressure assembly 100 of a pneumatic cleaning assembly 10, positive pressure gas into the battery housing 42.

In some embodiments, the method for press-fitting a battery top cover further comprises:

forming, by a negative pressure assembly 102 of the pneumatic cleaning assembly 10, negative pressure gas in a gap between the battery top cover 40 and the battery housing 42.

The above described are merely preferred embodiments of the present application and are not intended to limit the present application. Various changes and modifications may be appreciated by those skilled in the art. Any modification, equivalent substitution and improvement made within the spirit and scope of the present application should be included within the protection scope of the present application.

What is claimed is:

1. A press-fitting device associated with a battery having a battery top cover and a battery housing, the press-fitting device comprising:

a press-fitting body, the press-fitting body arranged on one side of the battery top cover, one side of the press-fitting body facing the battery top cover provided with a pneumatic cleaning assembly, wherein the pneumatic cleaning assembly is arranged to allow chips to move out of the battery housing together with gas along a gap between the battery housing and the battery top cover.

2. The press-fitting device according to claim 1, wherein the pneumatic cleaning assembly comprises a positive pressure assembly; the positive pressure assembly is arranged to introduce positive pressure gas into the battery housing.

3. The press-fitting device according to claim 2, wherein the positive pressure assembly comprises a positive pressure gas passage; a gas outlet end of the positive pressure gas passage is a positive pressure opening; the positive pressure opening is arranged near a center of the press-fitting body facing the battery top cover.

4. The press-fitting device according to claim 3, wherein the positive pressure opening is provided with a nozzle.

5. The press-fitting device according to claim 1, wherein the pneumatic cleaning assembly comprises a negative pressure assembly; the negative pressure assembly is arranged to introduce negative pressure gas into the gap between the battery top cover and the battery housing.

6. The press-fitting device according to claim 5, wherein the negative pressure assembly comprises a negative pressure gas passage; a gas inlet end of the negative pressure gas passage is a negative pressure opening; the negative pressure opening is arranged on an edge of the press-fitting body facing the battery top cover.

7. The press-fitting device according to claim 6, wherein the negative pressure opening is an annular hole shaped structure.

8. The press-fitting device according to claim 7, wherein the negative pressure opening is provided therein with a reinforcing rib that connects an inner ring and an outer ring of the annular hole shaped structure.

9. The press-fitting device according to claim 6, wherein the negative pressure assembly further comprises a chips storage tank; the chips storage tank is arranged on a side of the press-fitting body facing away from the battery top cover and is communicated with the negative pressure gas passage.

10. The press-fitting device according to claim 1, wherein a press-fitting cap arranged on a side of the press-fitting body facing away from the battery top cover and provided with a gas source interface communicated with the pneumatic cleaning assembly.

11. A method for press-fitting a battery having a battery top cover and a battery housing, the method comprising:
applying, by a press-fitting body, a force onto the battery top cover to press-fit the battery top cover to the battery housing;
deploying a pneumatic cleaning assembly on one side of the press-fitting body facing the battery top cover; and
introducing, by a positive pressure assembly of the pneumatic cleaning assembly, positive pressure gas into the battery housing.

12. The method for press-fitting a battery top cover according to claim 11, characterized by:
deploying, by a negative pressure assembly of the pneumatic cleaning assembly, negative pressure gas in a gap between the battery top cover and the battery housing.

* * * * *